Patented June 15, 1943

2,321,823

UNITED STATES PATENT OFFICE 2,321,823

OXIDATION OF PERCHLOROETHYLENE

Frederick William Kirkbride, Runcorn, England, assignor to Imperial Chemical Industries Limited, a corporation of Great Britain No Drawing. Application August 26, 1940, Serial No. 354,308. In Great Britain September 14, 1939

8 Claims. (Cl. 204—163)

This invention relates to the manufacture of oxidation products of perchloroethylene and more particularly to the manufacture of trichloroacetyl compounds.

It is known that trichloroacetyl chloride and phosgene are formed when perchloroethylene is exposed to sunlight for a prolonged period in an atmosphere of oxygen. It has also been stated that when a dilute solution of perchloroethylene in carbon tetrachloride was exposed to the light from an electric lamp or a mercury arc in the presence of both dissolved oxygen and chlorine, oxidation of the perchloroethylene occurred to the exclusion of chlorination. Hitherto, however, no commercially feasible method of preparing oxidation products, and particularly trichloroacetyl chloride, from perchloroethylene has been devised.

It is an object of the present invention to provide a process whereby good yields of oxidation products of perchloroethylene can be obtained from perchloroethylene by a commercially feasible method. It is a further object of the invention to provide a process whereby perchloroethylene oxide is produced by the oxidation of perchloroethylene. It is a further object of the invention to provide a process for the manufacture of trichloroacetyl chloride. It is yet a further object of the invention to provide a process for the manufacture of trichloroacetyl compounds. Further objects will be apparent hereinafter.

These objects are achieved according to the present invention by subjecting liquid perchloroethylene to the action of gaseous oxygen at an elevated temperature, while exposing the perchloroethylene to actinic radiation. Advantageously, the oxidation may be catalysed by introducing also a small proportion of chlorine, e. g. amounts of chlorine between 1 per cent and 20 per cent by volume of the oxygen brought into contact with the perchloroethylene. By this means the time taken to oxidise the perchloroethylene may be decreased by as much as two-thirds, although small amounts of the perchloroethylene may be converted to hexachloroethane.

By this oxidation process there is formed not only trichloroacetyl chloride and some carbonyl chloride but an isomer of the former believed to be perchloroethylene oxide and to have the formula

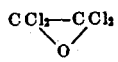

which remains in the liquid phase with the trichloroacetyl chloride. This isomer is readily converted into the trichloroacetyl chloride, e. g. by the action of a catalyst or by heating under suitable conditions, and is thus not readily isolated. Liquids rich in the isomer may, however, be obtained by distilling the reaction product at low pressures, i. e. pressures such that distillations proceeds at a temperature below 50° C. Solutions of the isomer in perchloroethylene may also be obtained by carrying out a partial oxidation of the perchloroethylene at, e. g. 50–60° C., and removing trichloroacetyl chloride from the resulting liquor by treating it at ordinary temperature with water or dilute alkali so that the comparatively rapidly decomposing chloride is hydrolysed and the hydrochloric and trichloracetic acids thus formed are dissolved, while the slowly decomposing oxide is substantially unchanged.

The amount of the isomer of trichloroacetyl chloride which is present in the oxidised liquor depends on the temperature at which the oxidation is carried out. Using temperatures of the order of 50° C. a considerable proportion of the oxidised liquid may be in the form of this substance, particularly if oxidation has not been carried as far as possible. When workig at higher temperatures, e. g. between 90° C. and 110° C. or up to the boiling point of the perchloroethylene, and with full oxidation, the amount of the isomer is negligibly small, substantially all of the liquid product being trichloroacetyl chloride. Like results will be obtained at still higher temperatures using elevated pressures such that the perchloroethylene remains liquid.

Although oxidation may be carried out at any elevated temperature at which the perchloroethylene is liquid, I find it advantageous to employ a temperature of at least 50° C., and for the best results, when I wish to prepare trichloroacetyl chloride, I use temperatures of the order of 95–110° C. By applying super-atmospheric pressures still higher temperatures may be used while still maintaining the perchloroethylene in the liquid phase. Thus, using a pressure of 200 lbs. per square inch (gauge reading) a temperature of 140° C. may be employed. On the other hand, when I wish to secure a product containing the isomeric oxide I prefer to work at a temperature between 50° C. and 60° C.

In a preferred form of my invention, any of the isomer present in the oxidised liquor is converted to trichloroacetyl chloride. This may be brought about by heating the liquid containing the isomer for some time, e. g. up to 24 hours at 100° C., but it is better to add to the liquid containing the isomer a small amount, e. g. 0.01 per cent to 0.1 per cent of a catalyst for the conversion; the change then proceeds readily at ordinary temperatures with evolution of heat. Suitable catalysts for the reaction are on the one hand anhydrous metal chlorides such as anhydrous ferric chloride, aluminium chloride or antimony pentachloride, which give slightly acidic solutions in water, and on the other hand, secondary or tertiary amines such as dimethylamine, trimethylamine, diethylamine, triethylamine, pyridine, picoline, or piperidine. It is, of course, known to stabilize chlorinated hydrocarbons such as perchloroethylene by adding small amounts of various substances including tertiary or secondary amines, and it will therefore be apparent that such substances should not be present during the oxidation step.

In one form of the invention in which the oxidation is performed so as to yield primarily trichloroacetyl chloride, a charge of amine-free perchloroethylene is put into a glass, or better, into a quartz vessel preferably fitted with stirrers; the charge is then exposed to the light from a mercury arc lamp or from a gas-filled incandescent filament lamp, while a slow stream of oxygen is passed through the liquid. The gas may, if desired, be diluted with an inert gas such as nitrogen, e. g. dry air may be used, though I find it better to use a gas with a higher proportion of oxygen. If necessary, external heating may be employed to maintain the suitable temperature, e. g. 95–110° C., at which the formation of the chloride proceeds to the substantial exclusion of the isomeric oxide; in most cases, however, the source of actinic radiation together with the heat of reaction will be sufficient to maintain the temperature necessary for satisfactory operation, and in some cases external cooling may be required. After some time, e. g., 4 to 12 days, depending on the temperature of the reaction liquor, the intensity of the actinic radiation and, to some extent, on the purity of the perchloroethylene, the oxidation process may be discontinued; the liquor is then worked up to purify the trichloroacetyl chloride, e. g. by fractional distillation to separate phosgene and small amounts of higher boiling by-products which are usually formed, or to convert it to another trichloroacetyl derivative as described hereinafter.

The boiling points of trichloroacetyl chloride and perchloroethylene are very close, and it is thus almost impossible to secure a complete separation of the two by distillation. If, therefore, it is desired to obtain trichloroacetyl chloride free from perchloroethylene, the oxidation must be continued until all of the latter has been oxidised even at the risk of a diminished yield through side reactions leading to the formation of phosgene. It is, however, possible to obtain by distillation of a mixture of the two, a product containing 96 per cent trichloroacetyl chloride, the remainder being perchloroethylene, and for many purposes, as for example when the chloride is to be converted into another trichloroacetyl derivative as described subsequently, the presence of, e. g. 4–5 per cent of perchloroethylene, is not objectionable. When the presence of the small amount of perchloroethylene is not objectionable I prefer not to carry the oxidation to completion, since the latter stages are much slower than the earlier ones, but to terminate the process when about 80–85 per cent of the perchloroethylene has been oxidised. The liquor is then worked up to recover the liquor rich in trichloroacetyl chloride. The unchanged perchloroethylene which is recovered may, after careful purification, be used again in the process.

In the further form of the invention in which the oxidation is catalysed by chlorine, small proportions of chlorine are introduced into the oxygen gas stream so that the gas delivered to the reaction vessel contains between, e. g. 1 per cent and 20 per cent by volume of chlorine, and the process is otherwise conducted as when oxygen free from chlorine is used. The product obtained when the oxidation process is terminated will then contain small amounts of hexachloroethane which may be removed, e. g. by distilling the product. During the distillation the conversion into trichloroacetyl chloride of any isomer product will also be effected.

The trichloroacetyl chloride and the isomeric oxide formed decompose on treatment with water with formation of acid products, the former decomposing quickly and the latter slowly. The liquor can thus be said to acquire an "acid value" which may be measured by shaking a sample with sufficient water to decompose these products and to dissolve hydrochloric acid and other acid products formed which can then be titrated with standard alkali. Where the reaction has been so conducted that substantially none of the isomer is present in the oxidised product but only the chloride, then the decomposition will soon be complete, but where oxide is also present the acid value may take some time to reach a substantially steady value, and thus the titration can only be made after an interval. The use of a large proportion of water, e. g. 200 times the volume of the sample decomposed, accelerates the decomposition of the oxide. The acid value obtained by the titration can be expressed as a normality, the latter being the number of volumes of normal alkali required to neutralise the aqueous acid extract from unit volume of the liquor. This "acid value" can be used as a method of following the course of the reaction, 100 per cent oxidation corresponding to a normality of 17.9 N, and intermediate extents of oxidation to a corresponding intermediate acid value. Thus 50 per cent would correspond to an acid value of 8.95 N and 30 per cent oxidation to 5.4 N.

By taking advantage of this method of following the course of the reaction, a continuous method of operation can be readily devised which is easy to control. This continuous method of operation may be carried out by providing a reaction vessel fitted with temperature regulating means, inlet for oxygen and for perchloroethylene, outlets for gaseous and for liquid reaction products, and a source of actinic radiation. The vessel is filled with a charge of perchloroethylene which is then irradiated while oxygen is passed in, and the temperature is allowed to rise to between 95° C. and 110° C. Samples of the liquid are withdrawn from time to time and the "acid value" of the samples determined by shaking with water and titrating the aqueous solution with caustic alkali. When the acid value has reached a suitable value, e. g. 15 N, an inflow of perchloroethylene is commenced and oxidised liquid is tapped off at a corresponding rate. This inflow is regulated to maintain the acid value at about 15 N, e. g. between 10 N and 16 N, this being determined by periodic testing of the acid value of the effluent liquid, and the temperature regulating means is actuated to maintain the temperature between the chosen limits.

It may in some cases be desirable to interrupt the process for a short time, e. g. due to temporary failure in a subsequent process for treating the crude reaction product or for other reasons. In such cases the oxidation process can be started up again if on stopping the process a charge of reaction liquor is retained in the reaction vessel which has the appropriate acid value, i. e. between 10 N and 16 N. Irradiation, heating to the reaction temperature, and recommencement of the flow of reactants are all that is then required to put the process in operation again.

The liquid reaction product obtained by any of the above variations of the invention, and which has been submitted to the extended heating, or which has been treated with the conversion catalyst, consists essentially of trichloroacetyl chloride together with any perchloroethylene which may have remained unoxidised, and, if chlorine has been used as a catalyst, of small amounts of hexachloroethane also. This crude trichloroacetyl chloride may, if desired, be used for the manufacture of other trichloroacetyl derivatives by employing the known reactions of acid chlorides with various organic and inorganic reagents. Thus esters may be made by refluxing the liquid with the appropriate alcohol whose ester is required, or trichloroacetamide may be formed by passing ammonia gas into the product, preferably diluted with a solvent such as trichloroethylene in which the amide is only slightly soluble in the cold, filtering off the precipitated mixture of ammonium chloride and trichloroacetamide, extracting the filtered precipitate with water to remove the ammonium chloride and drying the residue of trichloroacetamide. Trichloroacetic acid or trichloroacetic acid esters may also be made by mixing the oxidised liquid with water or with the appropriate alcohol and heating to, e. g. 50–100° C., without previous treatment with an amine or aluminium chloride catalyst; the heating which the oxidized liquid undergoes during the reaction serves both to convert oxide present to trichloroacetyl chloride, and to hydrolyse the latter to the acid or to cause it to react with the alcohol to give the corresponding ester as the case may be.

Alcohols which may be used in this process include aliphatic alcohols such as methyl, ethyl, propyl, isopropyl, 2-ethyl-hexyl and pinacolyl alcohols, aralkyl alcohols such as benzyl and tolyl alcohols and cyclic alcohols such as cyclohexanol and 1-methyl cyclohexanol.

The following examples illustrate but do not limit my invention, all parts being by weight.

Example I

A reaction vessel was used consisting of a porcelain pot fitted with a slate lid through which passed a thermometer, a gas inlet fitted with a number of jets to distribute the gas in the liquid, a gas outlet through a reflux condenser, and a stirrer. A socket of "Pyrex" glass ("Pyrex" is a registered trade-mark) was also fitted, into which a mercury arc lamp could be inserted so as to irradiate the interior of the vessel. An external cooling jacket was also provided for the pot.

A charge of 110 parts of perchloroethylene was introduced and occupied about three-quarters of the volume of the vessel; the lamp was then switched on and oxygen introduced at the rate of 0.27 part per hour; the temperature reached 100° C. as a result of heat radiated by the lamp and the heat of reaction. After 99 hours the liquor had acquired an acid value due to the acid chloride, of 17.1 N. (determined by treating a measured volume with water and neutralising the hydrochloric acid and trichloroacetic acid with standard alkali). The introduction of gas was then stopped and after cooling to atmospheric temperature the reaction liquor was run into another vessel and 0.08 part of triethylamine was added. The whole was then submitted to fractional distillation, the portion boiling between 117.5° C. and 118.2° C. being collected separately. Trichloroacetyl chloride of 96 per cent purity was thus obtained which represented a yield of 101 parts, corresponding to an 81 per cent conversion of the perchloroethylene.

Example II

A vessel of Pyrex ("Pyrex" is a registered trade-mark) was arranged close to a mercury arc lamp and was fitted up with a stirrer, an inlet for gas reaching to the lower part of the vessel and a gas outlet through a reflux condenser.

A charge of 570 parts of perchloroethylene was introduced into the vessel and occupied about three-quarters of its volume, the vessel was irradiated by the arc lamp and a gas stream containing 83 per cent oxygen and 17 per cent chlorine was passed through the charge at the rate of 8.2 parts per hour. The temperature was maintained at 100° C. After 38 hours the liquor had acquired an acid value (determined as in Example I) of 13.5 N. The introduction of gas was then stopped and the product was distilled, the fraction boiling between 118° and 130° C. being collected separately. Trichloroacetyl chloride of 78 per cent purity was thus obtained, representing a yield of 459 parts, corresponding to 73 per cent conversion of the perchloroethylene. 35 parts of hexachloroethane remained in the still. The wide boiling range of the product was due to the presence of further quantities of the hexachloroethane in the distillation.

In a similar run using oxygen only instead of oxygen containing some chlorine, 95 hours elapsed before the liquor acquired an acid value of 13.5 N. The crude product was, however, free from hexachloroethane.

Example III 18.8 parts of the 96 per cent trichloroacetyl chloride, prepared as in Example I, and 66 parts of trichloroethylene were placed in a flask fitted with a gas inlet, reflux condenser, and thermometer. Dry ammonia gas was passed in and external cooling was applied in order to maintain the temperature within the range 30–40° C. After 7 hours the absorption of ammonia ceased, the product was then cooled and filtered under suction to recover the trichloroethylene. The white solid remaining on the filter was thoroughly extracted with cold water to dissolve out the ammonium chloride present, and was finally dried. The yield of trichloroacetamide was 14.5 parts, corresponding to 89 per cent of the theoretical amount (referred to trichloroacetyl chloride taken). The melting point of the amide was 141–142° C.

Example IV 52 parts of 2-ethyl-n-hexyl alcohol were placed in a flask fitted with a reflux condenser, thermometer and dropping funnel. In the course of 2 hours, 76 parts of the 96 per cent $CCl_3.COCl$, prepared in Example I, were added to the alcohol. External cooling was applied to maintain the temperature below 70° C. Finally the mixture was heated for 1 hour at 100° C. to complete the reaction. The product was washed with sodium bicarbonate solution, then with water, and dried over sodium carbonate. It was then fractionated in vacuo and there was obtained, in addition to small quantities of perchloroethylene (from the acid chloride) and unchanged alcohol, 84 parts of 2-ethyl-n-hexyl trichloroacetate, which distilled at 154–157° C./30 mm. The yield was 76 per cent of the theoretical amount. The ester had a specific gravity of $1.55^{20}/_{20}$ and a refractive index $1.4571^{20}{}_D$.

Example V

Using the apparatus of Example II, 570 parts of perchloroethylene were oxidised by passing in oxygen at the rate of 7.2 parts per hour while maintaining the temperature at 50° C. until it was estimated from the amount of oxygen passed in that about a third of the perchloroethylene had been oxidised. Oxidation was then stopped and the liquor cooled. An acid value of a sample of the liquor was taken after allowing time for oxide present to be converted to chloride and was found to be 6.7 N.

A solution of the perchloroethylene oxide in perchloroethylene was obtained from the bulk of the liquor by shaking the cold liquor with water and adding dilute alkali periodically to restore neutrality, until the liberation of acid into the aqueous layer had become very slow. This treatment hydrolysed trichloroacetyl chloride and caused the resulant trichloroacetic and hydrochloric acids to be removed in the aqueous liquid. The resulting non-aqueous layer consisting of a solution of perchloroethylene oxide in perchloroethylene was then dried over fused calcium chloride. It then had an acid value of 0.25 N.

The presence of the oxide isomer of trichloroacetyl chloride in the solution was demonstrated by treating a sample of it with anhydrous aluminium chloride, when considerable heat was evolved, and the acid value rose to 3.55 N.

I claim:

1. The method of oxidizing perchloroethylene in order to produce a reaction product consisting primarily of trichloroacetyl chloride and the perchloroethylene oxide isomer thereof which comprises subjecting liquid perchloroethylene to the action of a gaseous mixture comprising oxygen and chlorine, said chlorine constituent therein being present in amounts ranging from 1 to 20% by volume, the temperature being maintained above room temperature while the reaction mixture is simultaneously exposed to the action of ultra-violet irradiation.

2. The method of oxidizing perchloroethylene in order to produce a reaction product consisting primarily of trichloroacetyl chloride and the perchloroethylene oxide isomer thereof which comprises subjecting liquid perchloroethylene to the action of gaseous oxygen, the temperature being maintained above 50° C. while the reaction mixture is simultaneously exposed to ultra-violet irradiation.

3. The method as defined in claim 2, wherein the reaction mixture is maintained at a temperature within the range 50 to 60° C. during said oxidation.

4. The method as defined in claim 2, wherein the reaction mixture is maintained at a temperature within the range 95 to 110° C. during said oxidation.

5. The method of oxidizing perchloroethylene in order to produce a reaction product consisting primarily of trichloroacetyl chloride and the perchloroethylene oxide isomer thereof which comprises subjecting liquid perchloroethylene to the action of a gaseous mixture which comprises gaseous oxygen and chlorine, the chlorine content thereof ranging from 1 to 20% by volume, the temperature of said reaction mixture being maintained above 50° C. while said reaction mixture is simultaneously exposed to ultra-violet irradiation.

6. A continuous method of oxidizing perchloroethylene in order to produce a reaction product consisting primarily of trichloroacetyl chloride and the perchloroethylene oxide isomer thereof which comprises subjecting liquid perchlorothylene to the action of gaseous oxygen at a temperature above room temperature while the reaction mixture is simultaneously exposed to ultra-violet irradiation until a small sample of the reaction mixture on treatment with water develops an acidity between 10 N and 16 N, then continuously withdrawing said reaction mixture while adding further amounts of liquid perchloroethylene and continuing to subject said liquid perchloroethylene to the action of gaseous oxygen, the rate of withdrawal and addition being so regulated as to maintain the reaction mixture at an acidity falling within the range 10 N to 16 N.

7. The method as defined in claim 6, wherein the gaseous oxygen is reacted with the liquid perchloroethylene at a temperature within the range 95 to 110° C.

8. The method as defined in claim 6, wherein the gaseous oxygen supplied to the reaction mixture contains an amount of chlorine ranging from 1 to 20% by volume.

FREDERICK WILLIAM KIRKBRIDE.